United States Patent
Aritomi

(10) Patent No.: US 7,948,643 B2
(45) Date of Patent: May 24, 2011

(54) INFORMATION PROCESSING APPARATUS, METHOD FOR ENHANCING PRINT FUNCTION, COMPUTER-READABLE PROGRAM FOR ENHANCING PRINT FUNCTION, PRINTER, PRINT METHOD, AND PRINT SYSTEM

(75) Inventor: Masanori Aritomi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1182 days.

(21) Appl. No.: 11/064,291

(22) Filed: Feb. 24, 2005

(65) Prior Publication Data

US 2005/0190395 A1    Sep. 1, 2005

(30) Foreign Application Priority Data

Feb. 27, 2004   (JP) .................. 2004-053190

(51) Int. Cl.
*G06F 3/12* (2006.01)
*G06K 15/00* (2006.01)

(52) U.S. Cl. ...................... 358/1.13; 358/1.14; 358/1.15

(58) Field of Classification Search ................. 358/1.13, 358/1.14, 1.15, 1.9, 1.16
See application file for complete search history.

(56) References Cited

U.S. PATENT DOCUMENTS

| | | | | |
|---|---|---|---|---|
| 5,832,298 | A | 11/1998 | Scanchez et al. | 395/828 |
| 6,552,813 | B2 * | 4/2003 | Yacoub | 358/1.1 |
| 2002/0171868 | A1 * | 11/2002 | Yoshimura et al. | 358/1.15 |
| 2004/0190042 | A1 * | 9/2004 | Ferlitsch et al. | 358/1.15 |

FOREIGN PATENT DOCUMENTS

JP        9-26867 A    1/1997

* cited by examiner

*Primary Examiner* — James A Thompson
(74) *Attorney, Agent, or Firm* — Fitzpatrick, Cella, Harper & Scinto

(57) ABSTRACT

An effective environment can be freely constructed in which multifunctional processing equivalent to high performance multifunction peripherals can be executed easily at low cost, by utilizing the print function of a printer driver as well as by selectively utilizing the functions of peripheral devices. In a print system environment where a print job can be issued to a printer 150 through a printer driver 203, the printer driver 203 communicates with predetermined peripheral devices thereby to search them for information of a peripheral device that can execute a substitute function processing, and updates the display of a print setting screen of the printer driver so as to allow utilization of a predetermined substitute function, in accordance with the retrieved substitute function information.

15 Claims, 13 Drawing Sheets

FIG. 6

```
<SUBSTITUTE FUNCTION>  ─600
    ─<STORAGE>        ─632                              633
 631     <DISK>
                <SIZE UNIT="MB", MINIMUM="10", MAXIMUM=" ">
                </SIZE>
                ...
        </DISK>
        ...
    </STORAGE>
    <SCANNER>
        ...
        ...
    </SCANNER>  ─641
    ...
</SUBSTITUTE FUNCTION>
```

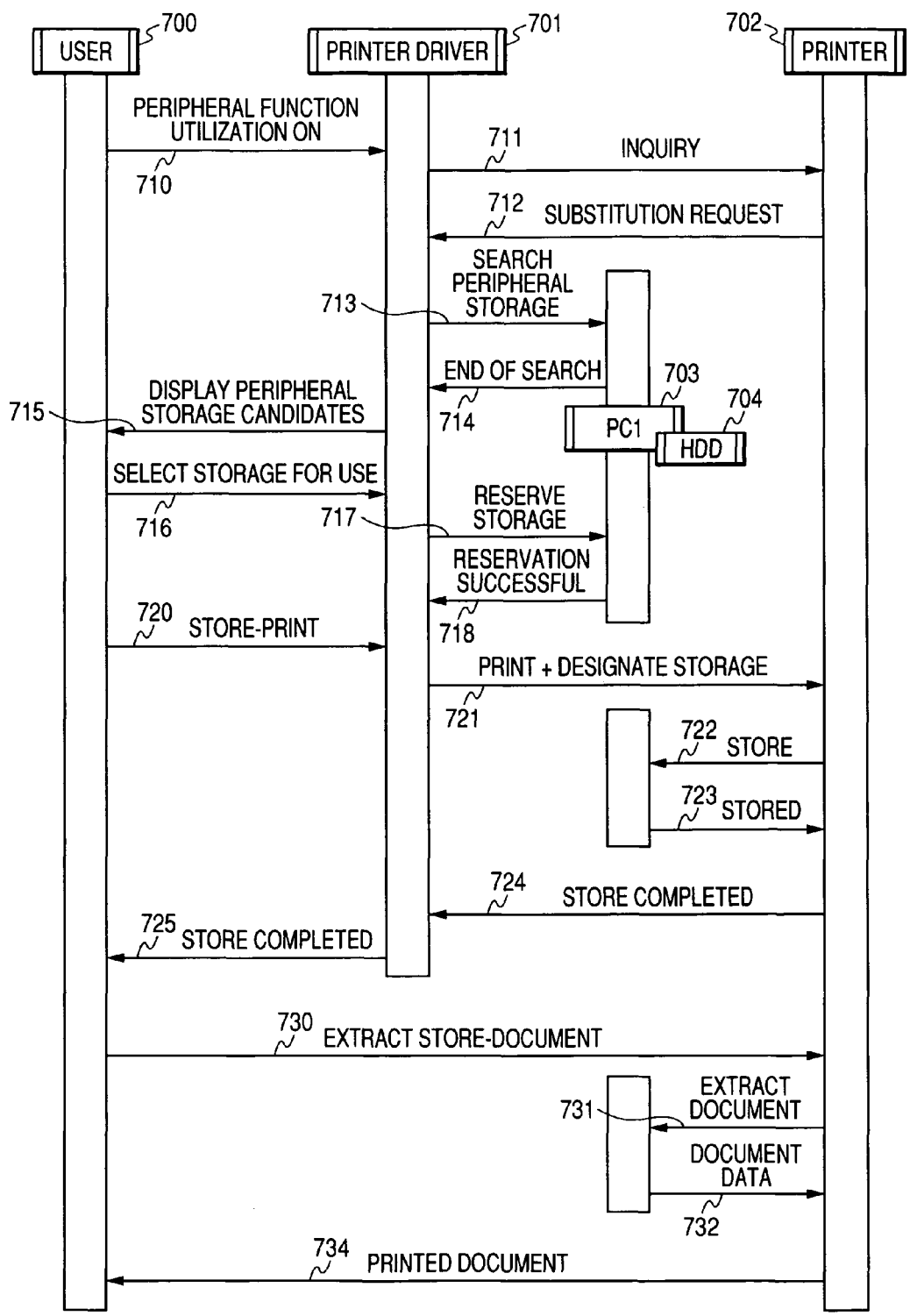

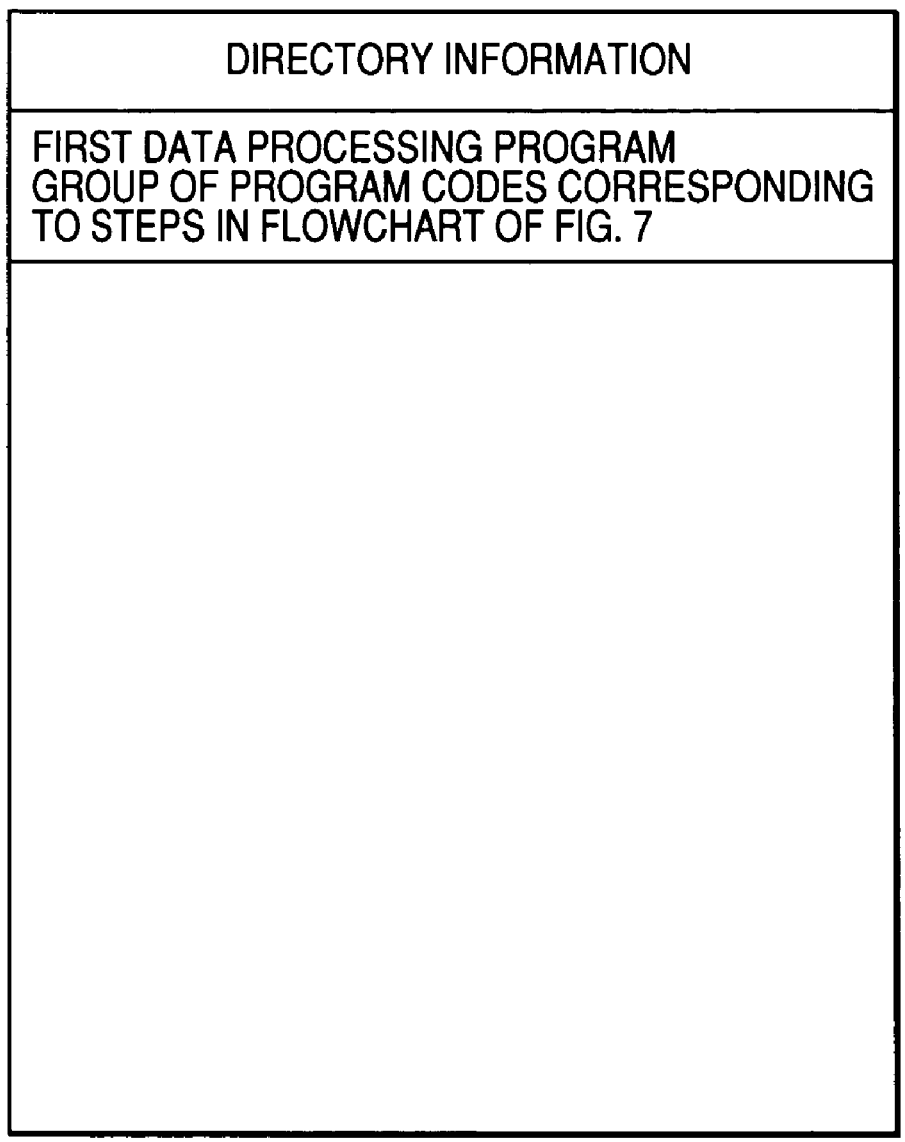

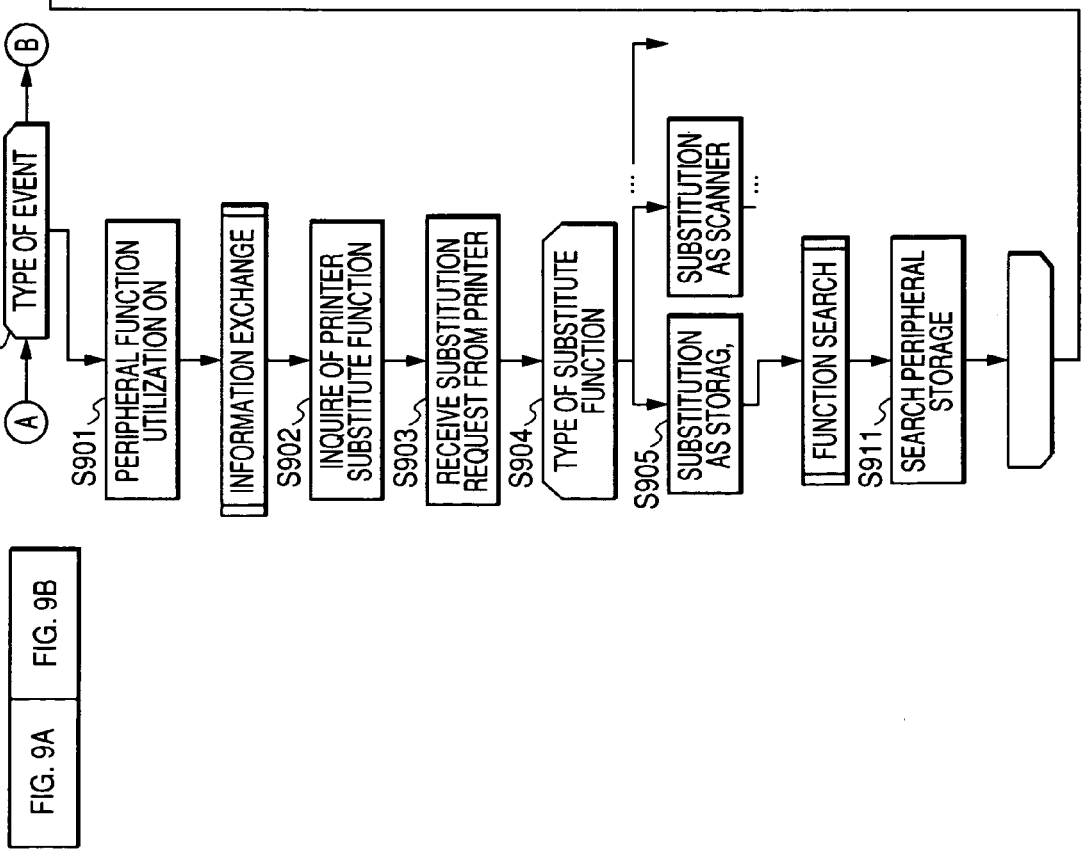

INFORMATION PROCESSING APPARATUS, METHOD FOR ENHANCING PRINT FUNCTION, COMPUTER-READABLE PROGRAM FOR ENHANCING PRINT FUNCTION, PRINTER, PRINT METHOD, AND PRINT SYSTEM

BACKGROUND OF THE INVENTION

1. Field of the Invention

The present invention relates to an information processing apparatus capable of issuing print jobs to a printer though a printer driver, and relates also to a method for enhancing a print function, a computer-readable program for enhancing a print function, a printer, a print method, and a print system.

2. Related Background Art

Multifunction Peripherals (MFP) combining the functions of a printer, scanner and other machines, such as one disclosed in Japanese Patent Laid-Open No. H09-26867, have been in general use for years.

For actual operations of these multifunction peripherals, device drivers for various functional settings are installed as a driver module in a data processor operative as a host computer. A prescribed advanced print function of such a multifunctional peripheral, which is designed by utilizing, for example, a hard disk, dedicated scanner and the like as a resource, can be implemented through a user interface of a printer driver.

These multifunction peripherals are, however, inevitably expensive as their advanced functional processing implementation involves high hardware costs. Therefore, the product structure of multifunctional peripherals goes against low-cost, downsizing demands.

In particular, recently falling product prices make it extremely difficult to manufacture the MFPs incorporating all necessary functional components.

SUMMARY OF THE INVENTION

The present invention has been made in consideration of the above problem, and has an object to construct a printing environment in which predetermined print functions unrealizable by a printer alone can be implemented by use of predetermined peripheral devices, in an information processing apparatus capable of issuing print jobs to the printer through a printer driver.

According to a first aspect of the present invention, there is provided an information processing apparatus capable of communicating with predetermined peripheral devices and capable of issuing a print job to a printer through a printer driver, the information processing apparatus comprising: mode selection means for selecting a function substitution mode in which a predetermined print function unimplementable by the printer alone is executed by utilizing the predetermined peripheral devices; search means for searching the predetermined peripheral devices for information of a peripheral device that can execute substitute function processing for the predetermined print function by communicating with the predetermined peripheral devices, after the function substitution mode is selected by the mode selection means; and display update means for updating display of a print setting screen of the printer driver so as to permit setting of the predetermined print function when the peripheral device information is found by the search means.

According to a second aspect of the present invention, there is provided a printer comprising: request acceptance means for accepting a function substitution request for utilizing the predetermined peripheral devices; transfer means for, upon receipt of a print job designating a peripheral device used as a substitute function, transferring the received print job to the designated peripheral device; extraction request input means for inputting a request for extraction of the print job stored in the peripheral device; request means for executing a document extraction request for the peripheral device when the request for extraction of the print job is input by the extraction request input means; and print execution means for executing print processing based on the print job supplied in accordance with the document extraction request of the request means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a diagram exemplarily showing a substitute function file managed by a printer driver of the host computer shown in FIG. 1;

FIG. 7 is an explanatory diagram of operations in a substitute function processing phase of the information processing apparatus according to the present invention;

FIG. 8 is an explanatory diagram of a memory map for a storage medium that stores therein various data processing programs readable by a print system to which the information processing apparatus according to the present invention is applicable;

DETAILED DESCRIPTION OF THE PREFERRED EMBODIMENTS

The preferred embodiments of the present invention will be described with reference to the accompanying drawings.

Figure 1:
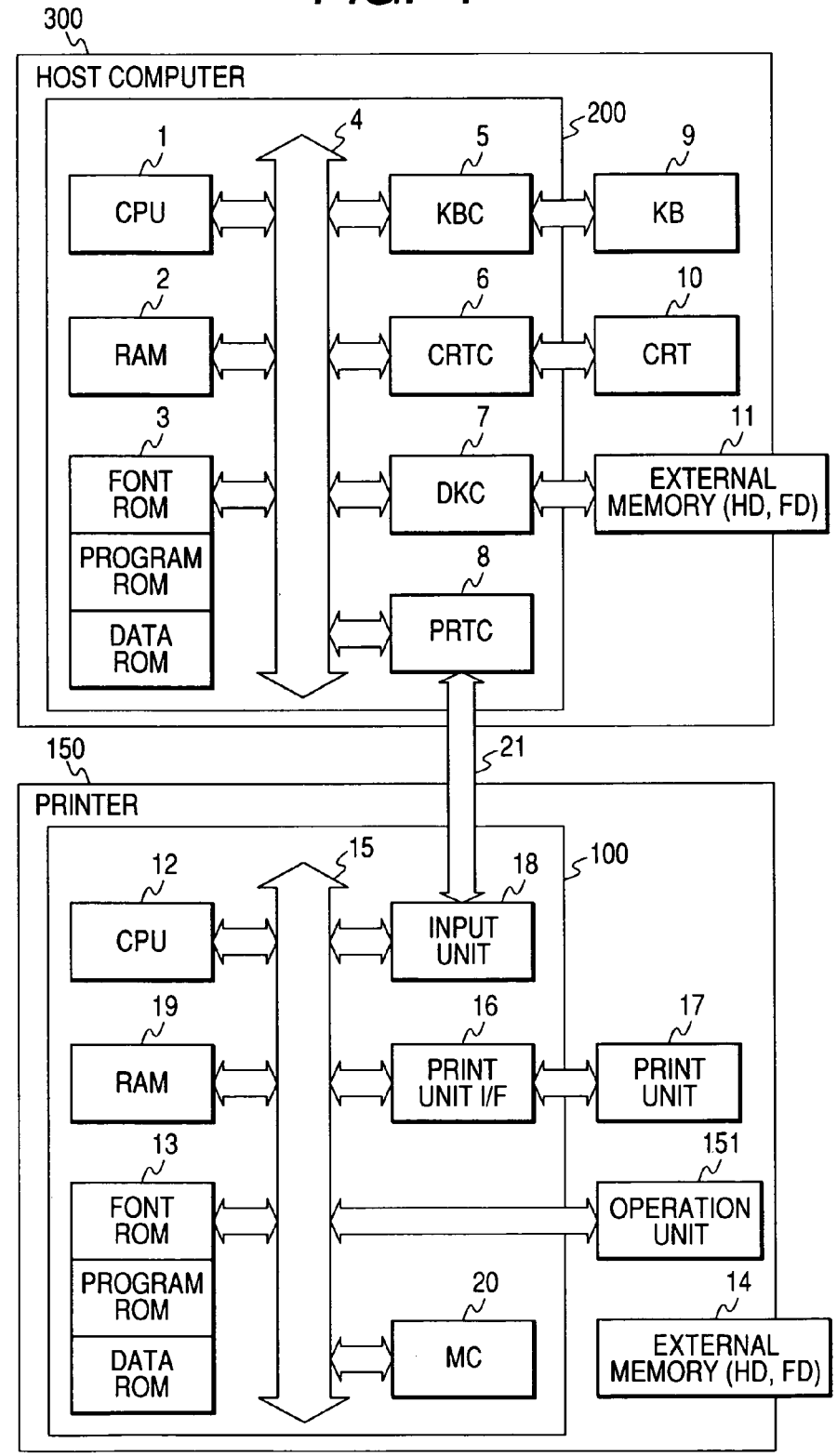
FIG. 1 is a block diagram showing a configuration of a print system to which an information processing apparatus according to a first embodiment of the present invention can be applied.

FIG. 1 is a block diagram showing the configuration of a print system to which an information processing apparatus according to a first embodiment of the present invention is applicable. This print system is so designed that a host computer 300, which is the information processing apparatus of the present invention, and a printer 150 is communicatively connected with each other. Either of a predetermined interface or a network can be used for this connection, and the choice of which to use is not limited by the application of the present invention.

In FIG. 1, the host computer 300 has a CPU 1 which processes complex documents containing graphics, images, characters, tables (including spreadsheets), and the like, on the basis of a document processing program stored in a program ROM of a ROM 3 or in an external memory 11. The CPU also controls the entire devices connected to a system bus 4.

The program ROM of the ROM 3 or the external memory 11 stores an operating system program (referred to as an OS, hereinafter) and the like as a control program of the CPU 1. A font ROM of the ROM 3 or the external memory 11 stores font data used for the document processing. A data ROM of the ROM 3 or the external memory 11 stores various data used for the document processing.

Reference numeral 2 denotes a RAM, which is operable as a main memory and work area of the CPU 1. Reference numeral 5 denotes a keyboard controller (KBC), which controls key inputs from a keyboard (KB) 9 or pointing device (not shown). Reference numeral 6 denotes a CRT controller (CRTC), which controls the display of a CRT display (CRT) 10. Reference numeral 7 denotes a disk controller (DKC), which controls access to the external memory 11 that stores a boot program, various applications, font data, user files, edit files, printer control command generating program (referred to as a printer driver, hereinafter), and the like. The external memory 11 may be a hard disk (HD), flexible disk (FD) or the like.

Reference numeral 8 denotes a printer controller (PRTC), which is connected to the printer 150 via a predetermined bi-directional interface 21 so as to control communication with the printer 150. The CPU 1 executes bitmapping (rasterization) of outline fonts of, e.g., display information set on the RAM 2 and guarantees WYSIWYG on the CRT 10. Furthermore, the CPU 1 opens various registered windows and carries out various data processing operations on the basis of commands pointed by a mouse cursor and the like displayed on the CRT 10. This enables users to open a window associated with print settings before printing, in order to set a printing method for the printer driver including print mode selection.

The printer 150 has a printer CPU 12 which outputs image signals as output information to a print unit (printer engine) 17 connected to a system bus 15 on the basis of a control program stored in a program ROM of a ROM 13 or in an external memory 14. The program ROM of the ROM 13 stores a control program of the CPU 12. A font program of the ROM 13 stores font data used to generate the above output information. A data ROM of the ROM 13 stores information used on the host computer 300 in the case where the external memory 14 such as a hard disk is not prepared in the printer 150.

The CPU 12 can communicate with the host computer 300 through an input unit 18 so as thereby to inform the host computer 300 of information on the printer 150. A RAM 19 is operable as a main memory and work area of the CPU 12, and the memory capacity thereof can be increased by using an optional RAM connected to an extension port (not shown). This RAM 19 is used as an output information rasterizing area, environmental data storage area, or NVRAM. Access to the above external memory 14, such as a hard disk (HD) or IC card, is controlled by a memory controller (MC) 20. The external memory 14 is optionally connected to the printer 150 to store font data, emulation program, and form data. Reference numeral 151 denotes an operation panel provided with operational switches, LED indicators, and the like.

The external memory 14 is not limited to a single unit, and one or more thereof may be provided. Therefore, the printer 150 may be configured to be connected with optional font cards to supplement the internal fonts or with external memories storing programs for interpreting printer control languages of different language systems. Furthermore, the external memory 14 may be a nonvolatile NVRAM (not shown) for storing printer mode setting information input from the operation panel 151.

Figure 2:
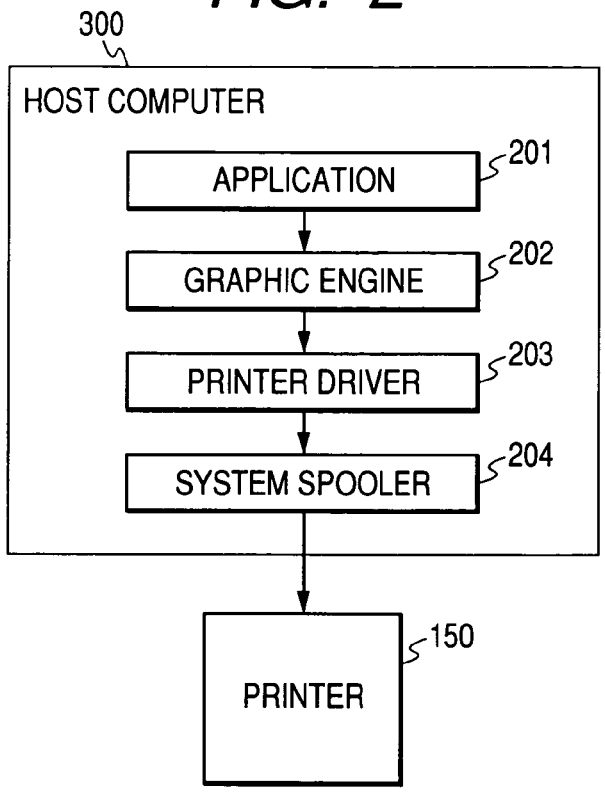
FIG. 2 is an explanatory diagram of a module configuration used for typical printing in a host computer shown in FIG. 1.

FIG. 2 is a an explanatory diagram of a module configuration used for typical printing in the host computer 300 shown in FIG. 1 to which a print device such as the printer 150 is connected directly or via a network.

In FIG. 2, an application 201, graphic engine 202, printer driver 203, and system spooler 204 are program modules that exist as a file stored in the external memory 11 and are loaded onto the RAM 2 and then executed by an operating system (OS) or other modules.

The application 201 and printer driver 203 can be additionally stored in the external memory 11 (HD) from an FD or CD-ROM, or via a network (not shown).

The application 201 stored in the external memory 11 is executed after loaded onto the RAM 2. In printing by the printer 150 using this application 201, the graphic engine 202, which also becomes available after loaded onto the RAM 2, is used to output (draw).

The graphic engine 202 loads the printer driver 203 prepared for every printer onto the RAM 2 from the external memory 11, and uses this printer driver 203 to convert the output of the application 201 to a control command for the printer 150. The resultant printer control command is output to the printer 150 via the interface 21 by way of the system spooler 204 loaded onto the RAM 2 by the OS.

Figure 3:
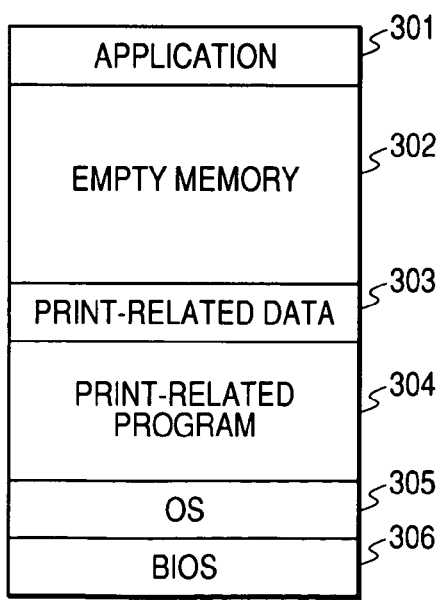
FIG. 3 is an explanatory diagram of a memory map of RAM shown in FIG. 1.

FIG. 3 is an explanatory diagram showing a memory map of the RAM 2 of FIG. 1, which corresponds to a condition where a print-related module containing a print program in this embodiment is made operable when loaded on the RAM 2 of the host computer 300.

In FIG. 3, reference numeral 301 denotes an application for printing, 302 denotes an empty memory, 303 denotes print-related data, 304 denotes print-related program, 305 denotes an OS, and 306 denotes a BIOS. The print control program in this embodiment is stored as part of the print-related program 304. The information processing apparatus thus configured will be now described according to the embodiment with reference to FIG. 4 and other drawings.

Figure 4:
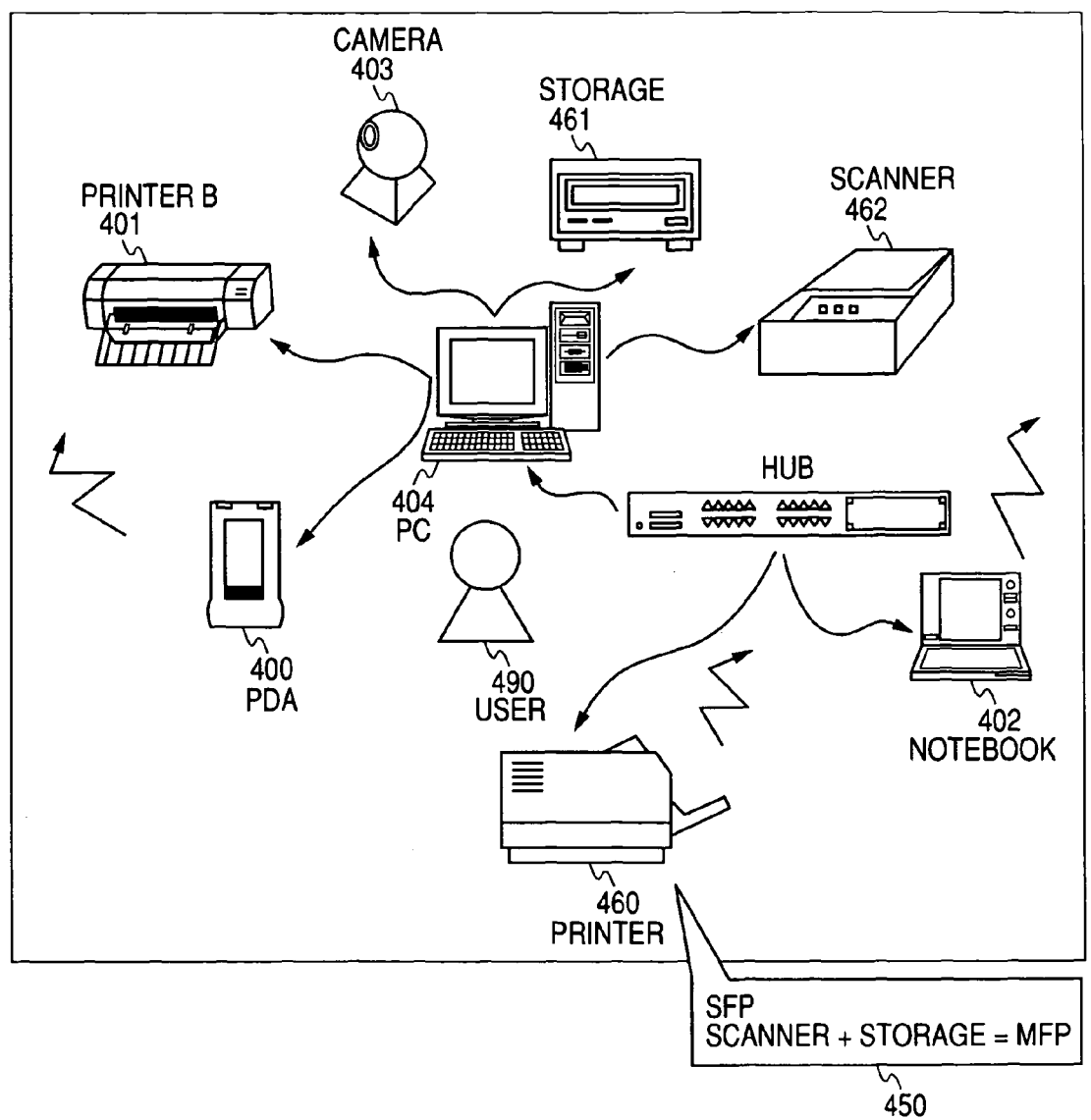
FIG. 4 is an explanatory view of a system configuration of peripheral devices of the information processing apparatus according to the present invention.

FIG. 4 is an explanatory view showing a system configuration of peripheral devices of the information processing apparatus according to the present invention. A user 490, who operates a data processing system, is in an environment that allows the user to manipulate various electronic devices, for example, a PDA 400, first printer (inkjet printer 401), second printer (laser beam printer 460), scanner 462, notebook PC 402, storage 461, digital camera 403, and PC 404.

In FIG. 4, when transmission lines (network) are built and the user 490 does not feel stressful in printing or file transfer by using this network, the printer 460 can offer the performance as high as that of advanced multifunction devices by utilizing the functions of the external storage 461 or scanner 462 in the system. Each of these devices is, however, controlled through their respective independent drivers as a dedicated unit.

In this circumstance, device registration of each of these devices is made for the printer driver to integrate their resources, so that the integrated resources are controlled as an MFP system with one UI for those resources indicated.

Figure 5:
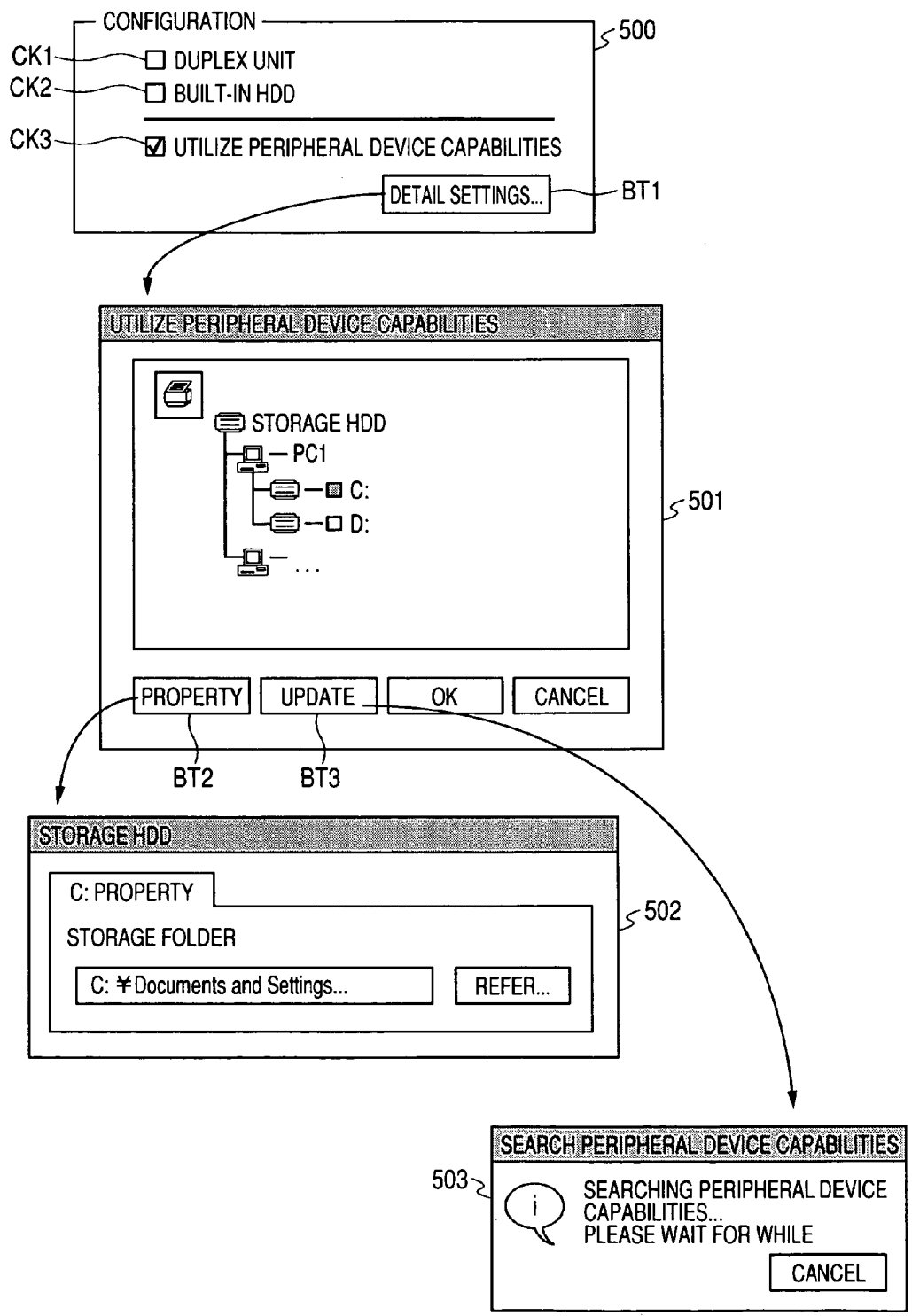
FIG. 5 is a view exemplarily showing a UI displayed on a CRT of the host computer shown in FIG. 1.

FIG. 5 is a view exemplarily showing an UI displayed on the CRT 10 of the host computer 300 shown in FIG. 1.

In FIG. 5, prepared in a configuration group box 500 in a printer driver operational screen is check boxes CKB1 and CKB2 for option settings of the printer (☐ Duplex unit, ☐ Built-in HDD, in this example) as well as a check box CKB3 for ☐<Utilize peripheral device capabilities>. When these check boxes CKB1 to CKB3 are checked (ON), the printer driver automatically makes a search for peripheral devices necessary to provide a multifunctional printer, and then carries out the capability checking and setting for the devices.

When a <Detail Settings . . . > button BT1 in the configuration group box 500 is pressed, a <Utilize peripheral device capabilities> dialog box 501 which allows users to make manual settings is displayed on the CRT 10 by the display control of the CPU 10 through the printer driver.

In the <Utilize peripheral device capabilities> dialog box 501, devices utilizable as a substitute function device are displayed in the form of tree rooted at the printer. When this setting is changed, a desired device is selected, and then a <Property> button BT2 at the lower part of the dialog box 501 is pressed. Upon pressing the <Property> button BT2, a property 502 of the desired device is opened for setting.

When the data displayed in the tree form is updated, a <Update> button BT 3 is pressed to instruct the update, whereupon peripheral devices start to be searched and a <Searching peripheral device capabilities> message box 503 is opened. Upon completion of searching, the data displayed in the tree form in the dialog 501 is updated.

When external storage is found as a substitute function as a result of the search, the setting of store-print can be made on the printer driver UI.

FIG. 6 is a diagram exemplarily showing a substitute function file managed by the printer driver of the host computer 300 shown in FIG. 1.

As seen from FIG. 6, <substitute function> data 600 to be informed to the control program to indicate a function necessary for the printer as a substitution has a data structure corresponding to a file in which categories of substitute functions and requirements of each category are systematized.

This file is designed so that the function categories required as a substitution are enumerated under the root. In this example, storage 631 and scanner 641 correspond to the function category. Described below the storage 631 are the requirements for the storage. Size designation 633 is described below the disk 632, which indicates the requirement for the storage area of, 10 MB minimum in this example.

Note here that this <substitute function> data may be held by the printer driver as a resource and thus does not always need to be acquired from the printer in a dynamic manner.

FIG. 7 is an explanatory diagram of operations of a substitute function processing phase in the information processing apparatus according to the present invention, referring to which this processing phase will be described by presenting operation instructions of a user 700, and operations of a printer driver 701 and printer 702 downward in time sequence order. The operational procedure of the printer driver 701 is the same as the steps in the flowchart, so the configuring a module based on these steps falls within the scope of the present invention.

The following description deals with the case where, when a built-in HDD is not provided in a printer such as the printer of FIG. 4, external storage (e.g., storage 461) found by the printer driver on PC is mapped for store-print.

The system components are a user 700, printer driver 701, printer 702, PC 703, and HDD 704 controlled by the PC 703.

First of all, a substitute function setting phase is described.

The user 700 manipulates the UI of the printer driver 701, and sets the utilization of peripheral functions into ON state by checking the CKB3 of FIG. 5 in step (710). This causes the printer driver 701 to receive the utilization instruction of peripheral functions. In response to this utilization instruction of peripheral functions, the printer driver 701 makes an inquiry about a substitute function request to the printer 702 that is set to an output destination of the printer driver (711). This substitute function request is a request to inquire about whether the printer accepts the utilization of functions of other peripheral devices. In response to the substitute function request, a substitution request indicative of acceptance of the utilization of other functions is sent from the printer 702 to the printer driver 701 of the host computer (712), whereupon the printer driver 701 issues a search request for searching peripheral storage devices in consideration of the substitute function category and search requirements (713). In this example, the PC 703 is inquired as search storage. This search request is made for a plurality of storage devices on the network. In response to the search request, the peripheral device PC 703 issues a search-completion notice indicating that it has been found by searching, and this search completion notice is then received by the printer driver 701 (714). The peripheral devices to be searched are not limited to the PC 703 and may be other devices such as another printer or scanner. For example, when storage is designated as a substitute function category and store-print function supportability is designated as a search requirement, a PC, printer, or multifunction peripheral (MFP) having an HDD and supporting a pull-print function (a function of issuing print jobs in response to a document extraction request) is found. On the other hand, when storage is designated as a substitute function category and form print function supportability is designated as a search requirement, a printer or multifunction peripheral (MFP) having an HDD as well as form data is found.

Then, the printer driver 701 displays on the UI (see the UI in FIG. 5) on the CRT 10, a peripheral device list 501 indicative of the candidates for peripheral storage, as a result of searching (715).

The user 700 can change the settings of this list displayed on the UI if necessary, by selecting a desired storage device for use (716), and then the designation of the desired storage device for use is input to the printer driver 710. When the storage is determined, the printer driver 701 causes the peripheral device PC 703 found by searching to reserve a substitute storage HDD 704 (717), and is then notified by the PC 703 that the reservation is successful (718). Successful storage reservation allows the utilization of the peripheral function, so that the printer driver 701 updates the print setting UI so as to permit the setting of the peripheral function that is allowed to utilize.

Next, a store-print phase will be described.

The user 700 opens a document to be printed from an arbitrary application, and instructs store-print using a pointing device through the user interface of the printer driver 701. In response to this print instruction, an instruction of rendering the document to be printed is input from the application to the printer driver 701 which also receives an instruction of store-print designated on the print setting UI of the printer driver 701 (720). On the basis of the instruction of rendering the document to be printed issued from the application, the printer driver 701 generates print data in a printer language (Page-Description Language: PDL) that can be interpreted by the printer 702, and creates print jobs including the store-print instruction to transmit the print jobs to the printer 702 (721). The print jobs created here include the store-print instruction as well as information designating a storage device for storing the print jobs (PC 703 in this embodiment). Upon receipt of the print jobs, the printer 702 analyzes these print jobs created by the printer driver 701, identifies the device designating information indicating a designated storage device, and instructs the PC 703 identified as a storage device to store the documents associated with the print jobs (722). When the PC 703 stores the print jobs in the HDD 704 in accordance with the instruction, the PC 703 informs the printer 702 of the store-completion (723). Upon receipt of the store-completion, the printer 702 also informs the printer driver 701 of the store-completion (724), whereupon the printer driver 701 displays the store-completion through the UI (725).

Lastly, a stored document extraction phase will be described.

When the user 700 manipulates an operation unit of the printer 702, a list of print jobs printable by the printer 702 is displayed on the operation unit of the printer 702. When the user selects a document he/she wants to print from the displayed print jobs, an instruction is issued to extract the selected document relevant to the print job stored in the HDD 704 of the PC 703 (730). In response to this instruction of extraction, the PC 703 extracts the corresponding document from the HDD 704, and outputs the extracted document to the printer 702 (731). The printer 703 analyzes the print job of the document received from the PC 704, and prints the document according to a known technique (732). When the printing of the document is completed, the user 700 obtains the printed document sheet output from the printer 702 (734) and then terminates the printing.

The external memory is a medium having recorded therein a print program that runs on the host computer 300 in the above-described embodiment, and may be an FD, HD drive, CD-ROM, IC memory card, or the like. Furthermore, it is allowable that the print program is recorded in the ROM 3 independently or together with an OS or other programs running on the host computer 300 so as to compose a memory map of the ROM 3 so that the print program may be executed directly on the CPU 1.

The same will apply to a print program running on the printer 150, similarly to the print program running on the host computer 300. Furthermore, it is allowable to configure a print control system by causing the print program itself running on the printer 150 to run on the host computer 300 and sending a print image from the host computer 300 to the print unit 17 through the print unit I/F 16 shown in FIG. 1.

When a plurality of predetermined peripheral devices having the same function are displayed on a display device such as the CRT 10, the printer driver displays an UI for making a user to choose which one of those peripheral devices to use.

The printer driver is, for example, designed so as to freely delete the print jobs stored in a storage device (storage 461), after the completion of the processing for print jobs in accordance with a predetermined deletion condition, in response to a deletion instruction from users, or on the basis of a command from the host computer. It is, of course, to be understood that a secure-print function can additionally be provided at this time.

Processing in Printer Driver

Now, descriptions will be given of processing in each component based on the time-sequential processing diagram of FIG. 7 by using flowcharts. The processing flow of the printer driver 701 is first described with reference to FIGS. 9A and 9B.

Figure 12:
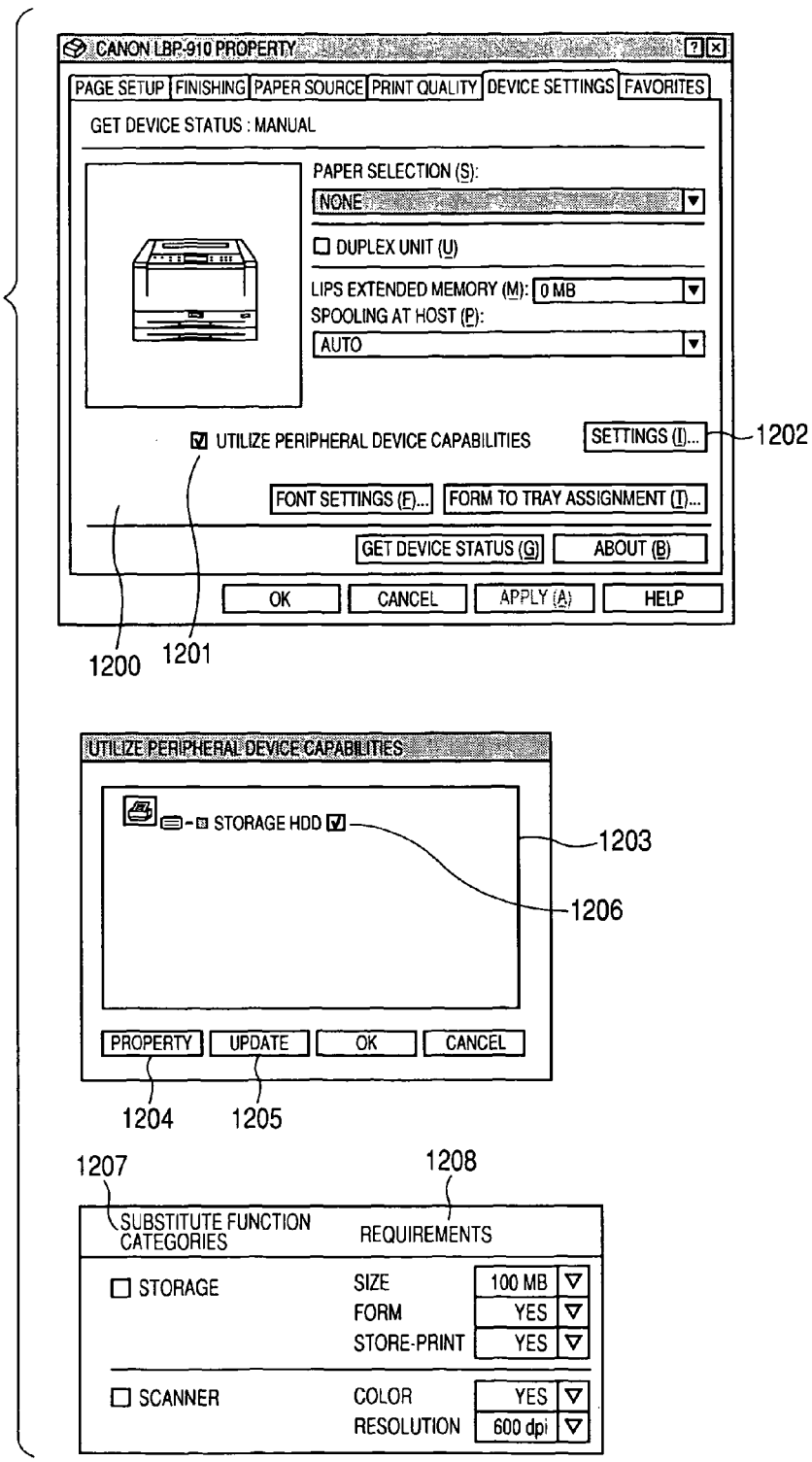
FIG. 12 is a view exemplarily showing the UI displayed on the CRT of the host computer shown in FIG. 1.

The printer driver 701 stored in the external memory 11 of the host computer 300 displays a printer property screen 1200 of FIG. 12 in response to a GUI (Graphical User Interface) call instruction from an application or OS (Operating System). This screen 1200 is displayed when, for example, the printer driver is selected from a printer folder and then a property display instruction is made through a mouse operation. The printer property screen 1200 (also simply called a driver UI) shown herein is a detailed view of the configuration UI 500 of FIG. 5, but the both are the same UI. On this driver UI, the device configuration of the printer 702 corresponding to the printer driver can be set. In this printer property screen 1200, there is a check box to designate "utilize peripheral device capabilities", and when this check box is checked, a detail setting button 1202 becomes available. When the detail setting button 1202 is pressed, a peripheral device capability utilization screen 1203 is displayed as a dialog. In this capability utilization screen 1203, there is provided a property button 1204 for setting the substitute function category and requirements for search, an update button 1205, and a check box 1206 for designating whether to utilize the capability of a retrieved device which can provide the substitute function.

When the property button 1204 is pressed, a UI for setting the substitute function category 1207 and search requirements 1208 is displayed as a dialog. The substitute function category 1207 corresponds, for example, to a storage function and scanner function. The search requirements correspond, in the case of the storage function, to the size of storage, presence/absence of form print function, and presence/absence of store-print function, and corresponds, in the case of the scanner function, to the necessity of color scanning and the value of reading resolution. These substitute function category and search requirements are displayed when the printer driver 701 reads the substitute function file shown in FIG. 6. The substitute function category and search requirements are input through the UI displayed as a dialog, and then the update button 1205 on the capability utilization screen 1203 displayed again is pressed, whereupon the searching is carried out.

In step S900, the printer driver 701 determines what an input instruction or event is for. When the instruction is made for utilizing the peripheral device function, the processing proceeds to step S901 in which the printer driver 701 sets a peripheral function utilization flag and enters into information exchange processing. In the next step S902, the printer driver 701 makes an inquiry about a substitute function request to the printer 702 that is set to an output destination of the printer driver 701. The substitute function request is a request for inquiring about whether to accept utilization of the functions of other peripheral devices.

In response to this substitute function request, a substitution request indicative of acceptance of the utilization of other functions is sent from the printer 702 to the printer driver 701 of the host computer (S903), whereupon the printer driver 701 inputs and sets the substitute function category and search requirements through the UI shown in FIG. 12 for setting the substitute function category and search requirements (S904). When the update button 1205 is pressed through the capability utilization UI 1203 of FIG. 12, the printer driver 701 issues a peripheral storage search request based on the set substitute function category and search requirements in step S905. This request includes category information set in the substitute function category 1207 and search requirement information set in the search requirements 1208, and is issued to a plurality of storage devices on the network. Then, the printer driver 701 advances to function search processing. In step S911, the printer driver 701 searches for responsive peripheral storage.

The printer driver receives from peripheral devices responsive to the search request, a search completion notice indicating that the substitute function category and search requirements are met, and then enters into function reservation processing.

In the function reservation processing, the printer driver 701 displays in the UI on the CRT 10 (see the UI in FIG. 5 and denoted as 1203 in FIG. 12), a peripheral device list 501 of the candidates for peripheral storage devices as a result of searching. The following description is about a function reservation phase for the substitute function found by searching. The flow diagram of FIG. 9 handles the exemplary case where the function reservation phase is carried out after the substitute function search is made. In this embodiment, storage is designated as the search category 1207, and store-print is set as the search requirements 1208.

In step S912, the printer driver 701 determines whether the retrieved peripheral devices are peripheral storage. When the printer driver determines that the peripheral storage is retrieved, the printer driver 701 displays, in step S914, a peripheral device list of the retrieved candidates for peripheral storage as shown by the capability utilization UI 1203 of FIG. 12. When no peripheral storage is retrieved, the printer driver 701 displays that there is no storage candidates in step S913. In the capability utilization UI 1203 of FIG. 12, a check is made in a check box 1206 for a desired peripheral device selected from the list of retrieved peripheral devices, and then the printer driver 701 provisionally fixes the storage for use and changed settings for the storage in step S915. Subsequently, when an OK button is pressed in the capability utilization UI 1203 of FIG. 12, the printer driver 701 executes, in step S916, the function reservation processing for the peripheral device having the provisionally fixed peripheral storage for use.

In step S917, the printer driver 701 determines whether the reservation of a storage area is made successfully, by communicating with the peripheral device subjected to the function reservation processing. When the storage area of the HDD 704 is successfully reserved as substitute storage, the printer driver 701 sets, in step S919, a flag to "1" indicating that the storage for use is fixed, and updates the display of the print setting user interface 1200 of the printer driver 701. On the other hand, when the reservation of storage fails, the printer driver 701 displays a failure message indicative of no storage. Or alternatively, the selection of other peripheral storage devices may be recommended.

It is to be understood here that a flow of reserving a function in advance of implementing the function can be considered the same as the above function reservation processing. In addition, the function search phase and function reservation phase can be carried out in either of the printer driver 701 or the printer 702.

Figure 13:
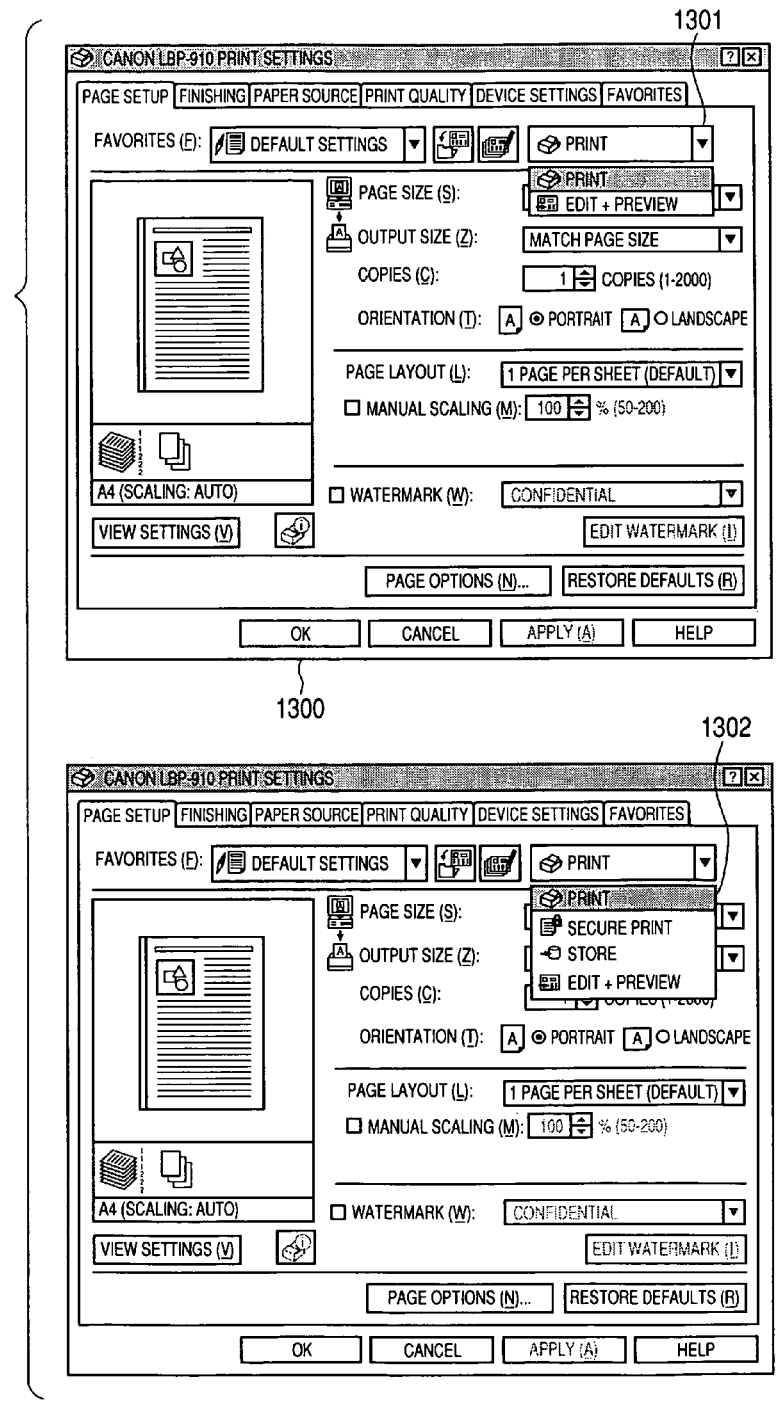
FIG. 13 shows display screens of a print setting UI indicated by the printer driver, prior to and after the substitute function processing.

Next, a store-print execution phase will be described, which is one of events generated in the printer driver 701. As previously described, the storage function reservation flag is set to "1" because the peripheral storage is reserved successfully, so that the printer driver 701 updates the display of the print setting user interface only when the flag is "1". For example, as seen from FIG. 13, a print method menu 1301 in the print setting UI 1300 is displayed to allow a user to choose one of two methods of "Print" and "Edit+Preview" before the peripheral device capability becomes available; however, four selectable methods of "Print", "Secure-Print", "Store", and "Edit+Preview" are displayed after the peripheral device capability becomes available (function reservation), as shown by a print method menu 1302 in the print setting UI 1300.

When the "Secure-Print" is selected in this print method menu 1302, the store-print is instructed.

When the store-print is instructed to the printer driver 701 in step S921, the printer driver confirms, in step S922, the storage for use that is reserved in the foregoing step S916. When the storage is not reserved, the printer driver 701 executes the function search and reservation processing again. When the storage for use is confirmed, the printer driver 701 generates print jobs described in a page-description language that can be interpreted by the printer 702, on the basis of a rendering command issued from an application, and then outputs the generated print jobs to the printer 702 via the system spooler 204. The print jobs include a store-print instruction as well as information designating peripheral storage to store the print jobs.

In step S925, the printer driver 701 confirms whether a store-completion notice is received. As described later, the store processing of the print jobs is carried out in a peripheral device, but the completion notice is received from the printer 702 to which the print jobs are output. When the store-completion notice is not received from the printer, the printer driver 701 displays a warning message indicating that the store processing is incomplete in step S926. When the store-completion notice is received from the printer, the processing for store-print in the printer driver 701 is terminated.

Lastly, a stored document extraction phase will be described. Although an instruction for printing stored documents can be issued through the operation panel of the printer 702, the explanation herein is provided for the case where the instruction for printing stored document can be issued from the printer driver 701.

In step S931, the printer driver 701 receives an instruction of extracting a store-document. For example, this extraction instruction is issued when a document extraction button (not shown) is pressed which is provided on the user interface of the printer driver 701.

Upon receipt of the stored document extraction instruction, the printer driver 701 confirms whether the peripheral storage device for use is available in step S932. When it is not available, the function search and reservation processing is executed again.

When the storage for use is confirmed, the printer driver 701 requests a document list stored in the peripheral device for the printer 702, and then receives it from the printer 702 in step S933. Upon receipt of the document list, the printer driver 701 displays it on the UI. Subsequently in step S934, the printer driver 701 receives an input through user's operations of an instruction of a document to be extracted from the document list to the printer 702. Then, the printer driver 701 outputs an extraction instruction to extract the input, specified store-document to the printer 702.

Next, in step S935, the printer driver 701 confirms a print completion notice from the printer 702. When a predetermined period of time passes without receiving the print completion notice, the printer driver 701 displays a warning message indicating that the printing of store-document is not completed in step S936.

Storage Reservation Processing in Peripheral Device

Figure 10:
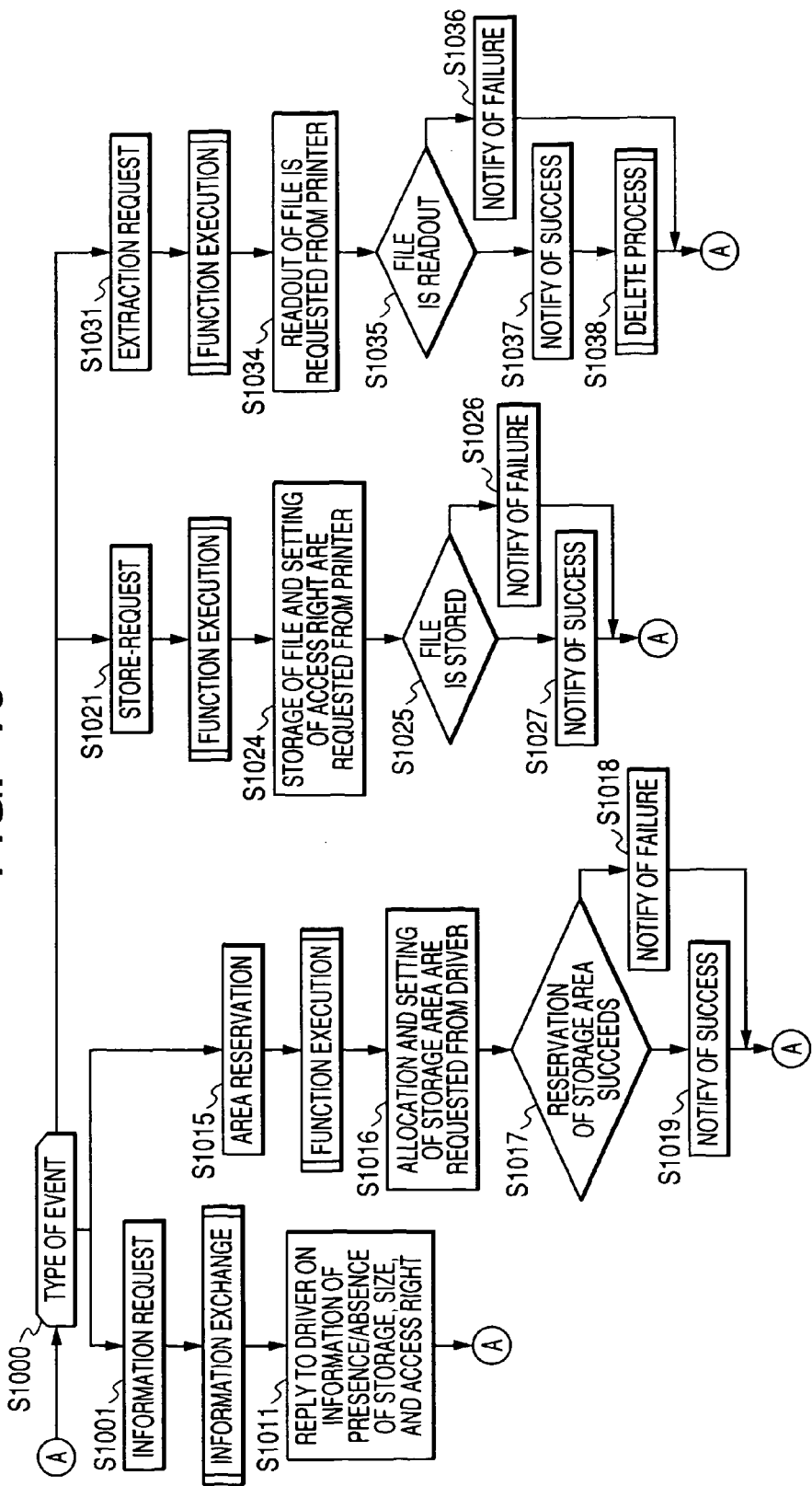
FIG. 10 is a flowchart of processing in a storage device when the substitute function processing is performed.

Referring next to FIG. 10, a processing flow executed when the peripheral device PC 703 reserves a storage area of the HDD 704 will be described.

In step S1001, the peripheral device PC 703 enters into an information exchange phase upon receipt of a peripheral storage search request from the printer driver 701.

In step S1011, the PC 703 responds back to the printer driver 701 with information including presence/absence of storage, storage size, and access right. This access right is represented by a user name of the host computer on which the printer driver 701 issuing the peripheral storage search request runs.

Subsequently upon receipt of a storage area reserving instruction from the printer driver 701, the peripheral device PC 703 shifts to a function reservation phase in step S1015, and then accepts storage allocation and settings from the printer driver 701 in step S1016. In step S1017, the PC 703 determines whether the storage area is reserved successfully. When it is successful, the PC 703 responds back to the printer driver 701 to inform of the success in step S1019. When the reservation of the storage area fails, the PC 703 responds back to the printer driver 701 to inform of the failure in step S1018.

Next, a store processing execution phase for a print job requested to be stored will be described.

In order for the printer driver 701 to transmit to the printer 702 the print job requested to be stored, the PC 703 receives a store-request from the printer 702 in step S1021, and starts the store function execution phase.

In step S1024, the peripheral device PC 703 receives a document corresponding to the print job to be stored and stores the received document in the storage area reserved in the HDD 704. The PC 703 also sets a right of access to the stored document. This access right is assigned to an owner of the print job. In step S1025, the PC 703 determines whether the store processing for the print job requested from the printer is normally completed. When it is normally completed, the PC 703 sends a notice of success to the printer 702 in step S1027, and when it is not normally completed, the PC 703 sends a notice of failure to the printer 702 in step S1026.

Lastly, a stored document extraction phase will be described.

When the PC 703 receives an extraction request for extracting a stored document from the printer driver 701 or printer 702, the extracting function execution phase is started. In step S1034, the peripheral device PC 703 receives from the printer 702, a read request for reading a document file stored in the storage area reserved in the HDD 704, and reads the documents corresponding to the requested print job. In this example, the PC 703 compares the user name representative of the access right for the requested document with the user ID included in the read request, and authorizes access when they match, so that the PC 703 reads the stored document and outputs the read document to the printer 702. On the other hand, when the access right is not granted or when the designated document does not exist, the read operation results in failure.

In step S1035, the peripheral device PC 703 determines whether the read operation of the requested document file is successful. When the read operation is successful because the access right is granted, the PC 703 responds back to the printer 702 with a notice of success at the same time with the output of the print job. On the other hand, when the access right is not granted or when there is no requested document, the PC 703 responds back to the printer 702 with a notice of failure. In step S1038, the already read document file is deleted as necessary, which means that this file is deleted if deletion following the read operation is set at the time of storing documents but remains stored without deletion if such setting is not made. The shift to the deletion processing is carried out in a known technique, so the description thereof is omitted.

Store-Print Processing in Printer Utilizing Substitute Function

Figure 11:
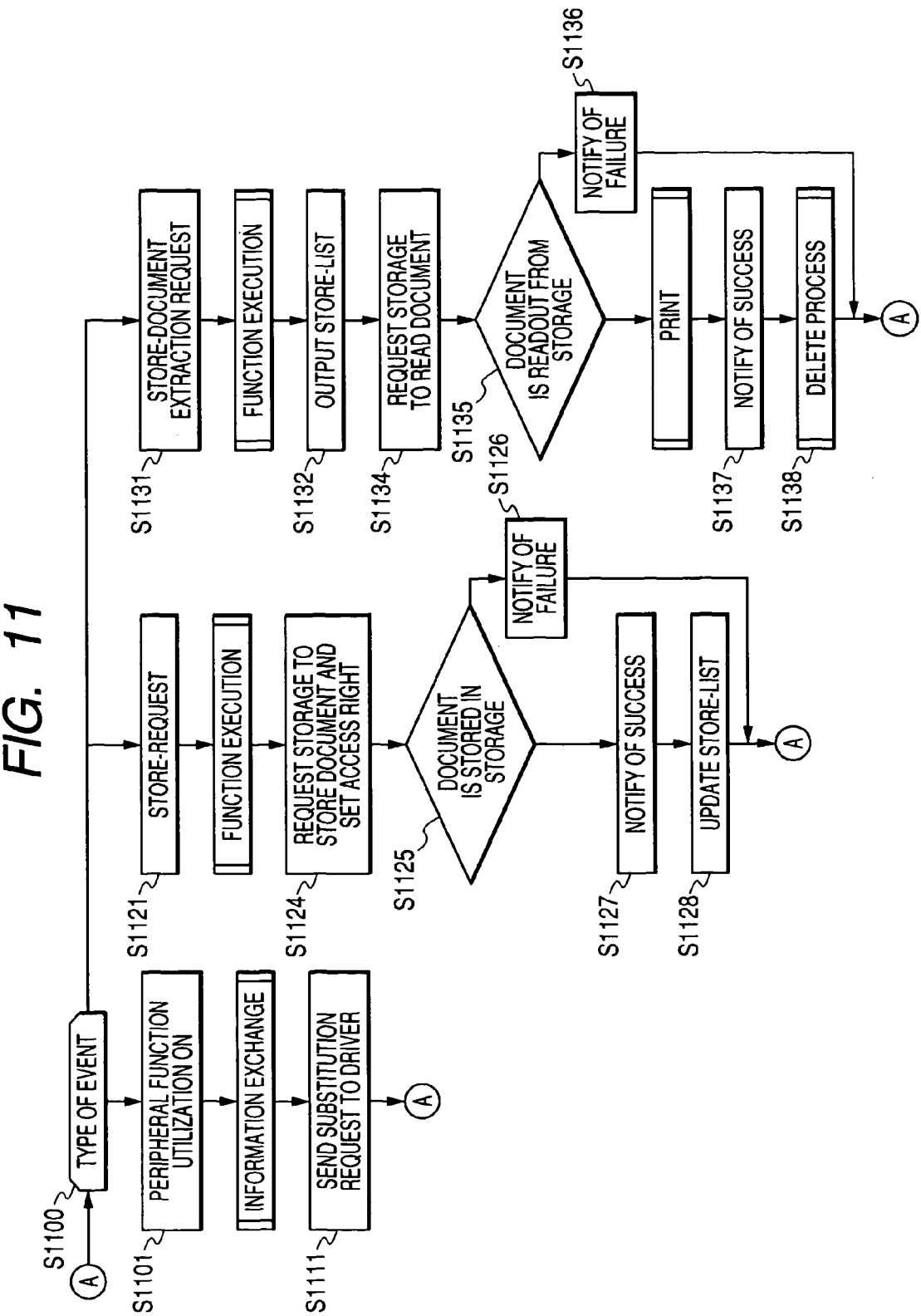
FIG. 11 is a flowchart of processing in a printer when the substitute function processing is performed.

Referring next to FIG. 11, a store-print processing in the printer 702 utilizing a substitute function will be described.

In step S1100, the printer 702 confirms the type of event to be executed. As shown in FIG. 7, when the printer 702 receives from the printer driver 701 the substitute function request to inquire about whether to accept utilization of functions of other peripheral devices, the printer 702 sets the peripheral function utilization flag ON to permit the utilization of peripheral device functions, and then stores the flag in the memory 14. The printer 702 shifts to the information exchange phase, and outputs the substitution request (712 of FIG. 7) to the printer driver 701 in step S1111.

Next, an execution phase of store-print utilizing a substitute function will be described.

In step S1100, when an event to be generated is store-print that is instructed by the printer driver 701, a store-job function execution phase is started. In step S1121, the printer 702 receives a store-request job and temporarily stores it in the RAM 19. In step S1124, the printer 702 analyzes the print job output from the printer driver 701, and identifies a peripheral storage device designated by the print job. The printer 702 then transfers a store-request of the print job to the peripheral storage device together with the print job in order to allow the utilization of the substitute function. The store-request designates to use an owner's name of the print job to gain access thereto.

Next in step S1125, the printer 702 determines whether the peripheral device PC 703 completely finishes storing the print job. When the printer 702 receives a notice of failure in storing from the PC 703, the printer 702 informs the printer driver 701 that the store-print fails in step S1126. On the other hand, when the printer 702 receives a store-completion notice from the PC 703, the printer 702 informs the printer driver 701 that the store-print is successful in step S1127. When the document store-processing of the print job is completely done in the PC 703, the printer 702 manages the name of the print job, accept time, owner name, and extraction password as a store-list, and stores the list in the external memory 14.

Lastly, a stored document extraction phase in the printer 702 utilizing a substitute function will be described.

In step S1100, when an event to be generated is store-document extraction request that is instructed by the printer driver 701, or when the store-document extraction request is input from the operation unit of the printer 702, the CPU 12 of the printer 702 internally issues the store-document extraction request in step S1131, and then shifts to an extraction function execution phase.

Subsequently in step S1132, the printer 702 reads a store-list of the stored documents in the external memory 14, and displays the list on the operation unit 151. When the store-document extraction request is issued from the printer driver 701, the printer 702 outputs the read store-list of the stored documents to the printer driver 701.

Upon receipt of a read request for reading a particular document from the operation unit 151 or printer driver 701 that has referred to the displayed or output store-list, the printer 702 issues an extraction request to the peripheral device PC 703 in order to instruct the PC 703 to extract the particular document from the HDD 704.

In step S1135, the printer 702 determines whether it has received the print job corresponding to the particular document from the peripheral device PC 703, and when the print job is not received for a predetermined period of time or when a notice of failure in readout is received from the PC 703, the printer 702 displays on the operation unit 151 or informs the printer driver 701 that that the document read operation fails in step S1136.

On the other hand, when the printer 702 receives the print job corresponding to the particular document from the peripheral device PC 703, the printer 702 analyzes the print job and then executes the printing in a usual printing manner. In step S1137, the printer 702 displays on the operation unit 151 or informs the printer driver 701 that the document read and print operations are successful. In step S1138, the extracted document is deleted as necessary. Specifically, the print job successfully printed is notified to the PC 703 thereby to cause the PC 703 to execute the processing in step S1038 of FIG. 10.

It is to be noted here that, even when the foregoing control or operation entities are replaced with other programs, utilities, printer, or operational panel thereof, the flows described so far and the object and advantageous effects of the present invention can be attained.

Now, the configuration of a data processing program readable by a print system to which the information processing apparatus of the present invention is applicable will be described with reference to the memory map shown in FIG. 8.

FIG. 8 is an explanatory view of the memory map of a storage medium having stored therein various data processing programs readable by the print system to which the information processing apparatus of the present invention is applicable.

Although particularly not shown, information for managing a group of programs stored in the storage medium, for example, version information, program editor, and the like are stored in the same storage medium, and additionally, information dependent on an OS for reading programs, e.g., program distinguishable icons, is stored in some cases.

Furthermore, data accompanying various programs is managed in the above directory. Moreover, a program for installing various programs on a computer, and a program for decompressing compressed programs to be installed, are stored in some cases.

Figure 9B:
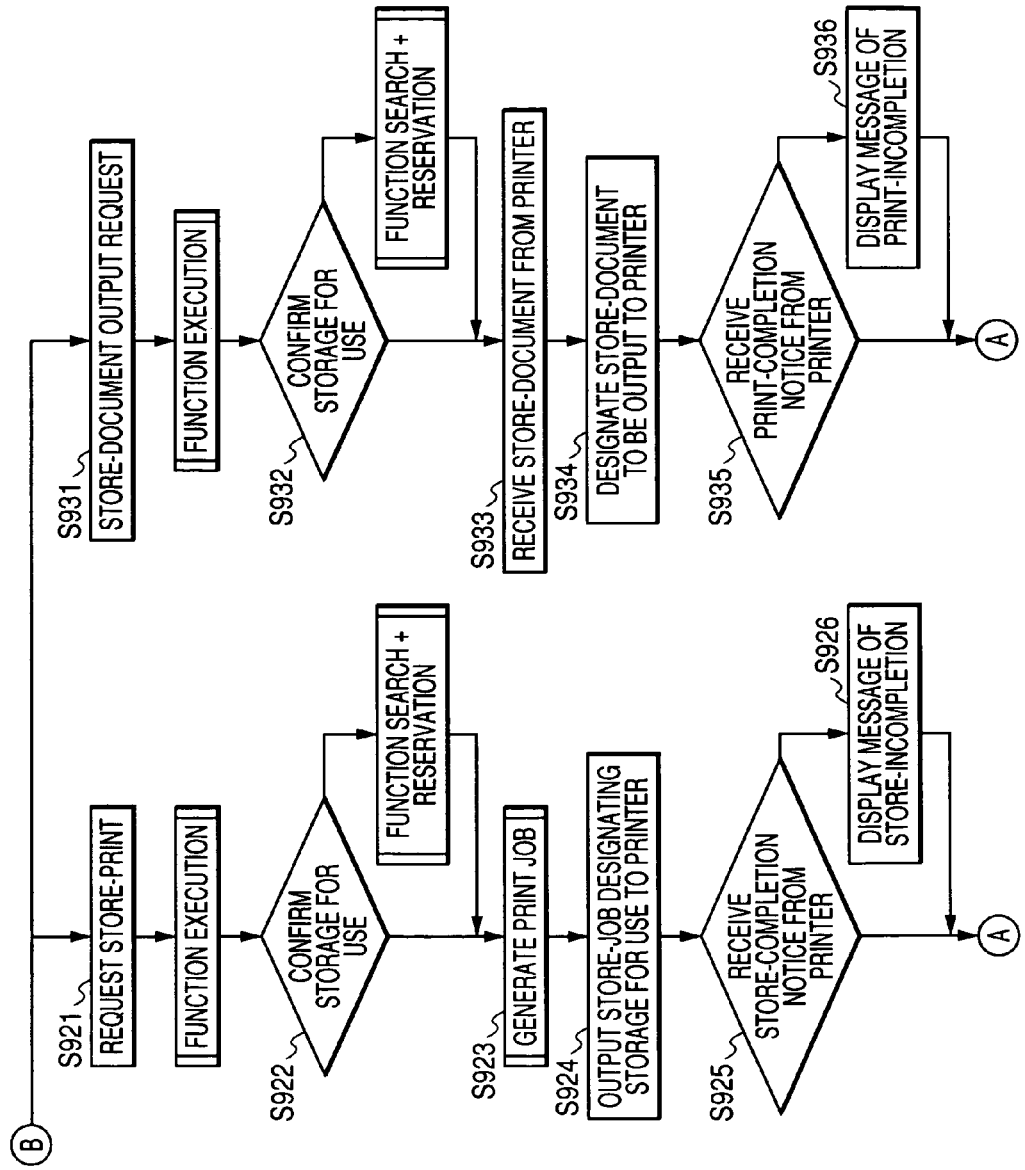
FIG. 9 is comprised of FIGS. 9A and 9B illustrating flowcharts of processing in the printer driver when the substitute function processing is performed.

The functions shown in FIG. 7, FIGS. 9A and 9B printer driver), and FIG. 10 (peripheral device PC 702) in this embodiment may be implemented on a host computer or server computer by a program installed externally. In this case, a group of information including programs may be supplied to an output device from a storage medium, such as a CD-ROM, flash memory, or FD, or from an external storage medium via a network, which falls within the scope of the present invention.

It is a matter of course that the object of the present invention is achieved by supplying to a system or apparatus a storage medium having stored a software program code for realizing the functions in the foregoing embodiment, and then causing a computer (or CPU, MPU) of the system or apparatus to read and execute the program code stored in the storage medium.

In this case, the program code itself read from the storage medium implements the novel functions of the present invention, and the storage medium having stored this program code constitutes the present invention.

Therefore, a program can take any form including an object code, a program executed by an interpreter, script data supplied to an OS, and the like, as long as having the function as a program.

The storage medium for supplying a program includes a flexible disk, hard disk, optical disk, magneto-optical disk, MO, CD-ROM, CD-R, CD-RW, magnetic tape, nonvolatile memory card, ROM, DVD, and the like.

In this case, the program code itself read from the storage medium implements the functions of the foregoing embodiment, and the storage medium having stored the program code constitutes the present invention.

Another method of supplying a program is to connect to an Internet homepage using a browser of a client computer, and then download the computer program itself of the present invention or a compressed file having an automatic installation feature from the homepage onto a recording medium such as a hard disk. In addition, the program code constituting the program of the present invention may be divided as files so that the respective files can be downloaded from different homepages. That is, a WWW server or ftp server that allows users to download program files for realizing the functions of the present invention in a computer is within the scope of the claims of the present invention.

Furthermore, the functions of the foregoing embodiment can be realized by encoding the program of the present invention to store it in a storage medium such as a CD-ROM to be distributed to users, and then allowing users who meet a predetermined condition to download key information for decoding from a homepage via the Internet, so as thereby to execute and install the program in a computer that is decoded by the key information.

Moreover, the functions of the foregoing embodiment can be realized not only by executing the program code read by the computer but also by some or all of actual processing operations executed by an OS (operating system) running on the computer on the basis of an instruction of the program code.

Furthermore, the functions of the foregoing embodiment can be realized by some or all of actual processing operations executed by a CPU or the like mounted in a function extension board or function extension unit, which is inserted in or connected to the computer, after the program code read out from the storage medium is written in a memory of the extension board or unit.

The present invention is not limited to the foregoing embodiment, and various changes and modifications (including organic combinations of the embodiments) can be made within the scope of the present invention.

The present invention has been described in detail with respect to various examples and the embodiment, and it is apparent to those skilled in the art that the spirit and scope of the present invention are not limited to particular descriptions in the specification.

The present invention is not limited to the foregoing embodiment, and it is matter of course that various changes and modifications can be made without departing from the spirit of the present invention.

As many apparently widely different embodiments of the present invention can be made without departing from the spirit and scope thereof, it is to be understood that the invention is not limited to the specific embodiments thereof except as defined in the appended claims.

The present invention can offer an advantage of freely construct an environment in which multifunctional processing equivalent to high performance multifunction peripherals can be executed easily at low cost by utilizing the print function of a printer driver as well as by selectively utilizing the functions of peripheral devices.

This application claims priority from Japanese Patent Application No. 2004-053190 filed Feb. 27, 2004, which is hereby incorporated by reference herein.

What is claimed is:

1. An information processing apparatus for communication with a plurality of peripheral devices, the apparatus comprising:
    a mode selection unit that selects a function substitution mode in which a predetermined print function that is not executable by a first one of the plurality of peripheral devices alone is made executable by utilizing the first peripheral device with another peripheral device;

a search unit that searches for a second one of the plurality of peripheral devices that can execute substitute function processing for the predetermined print function by communicating with the first peripheral device, after the function substitution mode is selected by said mode selection unit;

a display update unit that updates display of a print setting screen of a printer driver for the first peripheral device by additionally listing the predetermined print function, so as to permit a user to select the predetermined print function via the print setting screen, when the second peripheral device is found by said search unit; and an instruction unit that instructs the first peripheral device to execute the predetermined print function based on a selection of the predetermined print function via the print setting screen of the printer driver for the first peripheral device updated by said display update unit, so that the first peripheral device executes the predetermined print function by communicating with the second peripheral device and utilizing the substitute function processing of the second peripheral device.

2. The information processing apparatus according to claim 1, further comprising a search setting unit that sets a substitute function category and search requirements for the second peripheral device to be searched by said search unit, wherein said search unit searches for the second peripheral device in accordance with the substitute function category and search requirements set by said search setting unit.

3. The information processing apparatus according to claim 1, further comprising a display unit that lists, on a display device, the second peripheral device found by said search unit.

4. The information processing apparatus according to claim 3, further comprising a selection unit that, when a plurality of the second peripheral devices having the same function are listed on the display device by said display unit, selects one of the plurality of second peripheral devices to use.

5. The information processing apparatus according to claim 1, wherein the predetermined print function is a store-print function by which the print job is stored in a storage unit of the second peripheral device and printing is carried out by sending a request for reading the print job from the first peripheral device to the second peripheral device.

6. A method of enhancing a print function for an information processing apparatus capable of communicating with predetermined peripheral devices and capable of issuing a print job to a printer through a printer driver, the method comprising:

a mode selection step of selecting a function substitution mode in which a predetermined print function that is not executable by a first one of the plurality of peripheral devices alone is made executable by utilizing the first peripheral device with another peripheral device;

a search step of searching for a second one of the plurality of peripheral devices that can execute substitute function processing for the predetermined print function by communicating with the first peripheral device, after the function substitution mode is selected in said mode selection step;

a display update step of updating display of a print setting screen of a printer driver for the first peripheral device by additionally listing the predetermined print function, so as to permit a user to select the predetermined print function via the print setting screen, when the second peripheral device is found in said search step: and an instruction step of instructing the first peripheral device to execute the predetermined print function based on a selection of the predetermined print function via the print setting screen of the printer driver for the first peripheral device updated in said display update step, so that the first peripheral device executes the predetermined print function by communicating with the second peripheral device and utilizing the substitute function processing of the second peripheral device.

7. The method according to claim 6, further comprising a search setting step of setting a substitute function category and search requirements for the second peripheral device to be searched in said search step, wherein said search step includes searching for the second peripheral device in accordance with the substitute function category and search requirements set in said search setting step.

8. The method according to claim 6, further comprising a display step of listing, on a display device, the second peripheral device found in said search step.

9. The method according to claim 8, further comprising a selection step of, when a plurality of the second peripheral devices having the same function are listed on the display device in said display step, selecting one of the plurality of second peripheral devices to use.

10. The method according to claim 6, wherein the predetermined print function is a store-print function by which the print job is stored in a storage unit of the second peripheral device and printing is carried out by sending a request for reading the print job from the first peripheral device to the second peripheral device.

11. A non-transitory computer-readable medium storing, in executable form, a computer program for causing a computer to perform method of enhancing a print function for an information processing apparatus capable of communicating with predetermined peripheral devices and capable of issuing a print job to a printer through a printer driver, the method comprising:

a mode selection step of selecting a function substitution mode in which a predetermined print function that is not executable by a first one of the plurality of peripheral devices alone is made executable by utilizing the first peripheral device with another peripheral device;

a search step of searching for a second one of the plurality of peripheral devices that can execute substitute function processing for the predetermined print function by communicating with the first peripheral device, after the function substitution mode is selected in said mode selection step;

a display update step of updating display of a print setting screen of a printer driver for the first peripheral device by additionally listing the predetermined print function, so as to permit a user to select the predetermined print function via the print setting screen, when the second peripheral device is found in said search step; and an instruction step of instructing the first peripheral device to execute the predetermined print function based on a selection of the predetermined print function via the print setting screen of the printer driver for the first peripheral device updated in said display update step, so that the first peripheral device executes the predetermined print function by communicating with the second peripheral device and utilizing the substitute function processing of the second peripheral device.

12. The non-transitory computer-readable medium according to claim 11, wherein the method further comprises
a search setting step of setting a substitute function category and search requirements for the second peripheral device to be searched in said search step,
wherein the search step includes searching for the second peripheral device in accordance with the substitute function category and search requirements set in said search setting step.

13. The non-transitory computer-readable medium according to claim 11, wherein the method further comprises a display step of listing, on a display device, the second peripheral device found in said search step.

14. The non-transitory computer-readable medium according to claim 13, wherein the method further comprises a selection step of, when a plurality of the second peripheral devices having the same function are listed on the display device in said display step, selecting one of the plurality of second peripheral devices to use.

15. The non-transitory computer-readable medium according to claim 11, wherein the predetermined print function is a store-print function by which the print job is stored in a storage unit of the second peripheral device and printing is carried out by sending a request for reading the print job from the first peripheral device to the second peripheral device.

* * * * *